Patented Sept. 2, 1930

1,774,872

UNITED STATES PATENT OFFICE

ALFRED H. COWLES, OF SEWAREN, NEW JERSEY, ASSIGNOR TO THE ELECTRIC SMELTING & ALUMINUM COMPANY, OF CLEVELAND, OHIO, A CORPORATION OF OHIO

DETERGENT AND PROCESS OF PRODUCING THE SAME

No Drawing.    Application filed March 2, 1926.   Serial No. 91,821.

The object of my invention is to furnish a cheaply produced composition of matter, useful generally, and particularly as a highly efficient detergent either by itself, when in proper physical condition, or in admixture with soap and suds; and one to which other substances for specific detergent uses may be added. Another object relates to evolving one or more cheap methods of producing the same.

In the art of cleansing, water glass formed of between two and four molecular weight proportions of silica to only one molecular weight proportion of sodium metal oxide ($Na_2O$) or potassium metal oxide ($K_2O$), generally in a viscuous watery solution, has been quite commonly used to mix with soaps and soap powders in their manufacture. Due to cheapness the sodium water glass has found greater use than the potassium water glass. However, the very high amount of silica present in commercial water glass holds its alkali metal oxide too tightly to permit, during cleansing operations, such oxide to free itself so that by greater chemical affinity it may enter into combination with fatty or other organic acid materials and act as a cleansing agent through forming salts with such materials that are freely soluble in water. Failure to remove these organic acids prevents insoluble dirt being rinsed away from the material undergoing cleansing, by the physical action of moving water. Furthermore, water glass is unsuited for detergent uses in that if it does decompose, it leaves hydrated silica deposited in or upon the articles being cleansed. When produced as an anhydrous material, even when finely ground, it is so slowly soluble in water that it requires digestion under pressure or prolonged heating in boiling water to effect its solution. When shipped as a viscous liquid, in cold weather it does not flow readily. Further, soaps and washing powders in which water glass is a component, always carry with them a large amount of water due to the hydration of the water glass, upon which freight must be paid. Water glass in anhydrous form is difficult to produce free from lime and iron oxide, which are detrimental in cleansing operations. Iron oxide, especially in the washing of clothing, produces stains and discolorations. Oleate of calcium, which may form, produces spots and blotches on clothing. In the soap industry water glass is only of value as a stiffening agent and as a diluent of soaps, while the substance I am about to describe not only acts as a stiffening agent, but with it soaps can be made that will free more alkali during use than ordinary soaps, thus increasing their detergent value and reducing their cost of production.

In order to form this detergent I take from three quarters up to one and one-eighth molecular weight proportions of alkali metal carbonate to one molecular weight proportion of silica and thoroughly mix them. I then charge said mixture into a proper furnace and bring it to a fused condition. In this fusion operation all or nearly all of the carbon dioxide contained in the alkali metal carbonate is driven off as a gas, after which the fused product consists of alkali metal oxide and silica in combination. This produces a fused product that is a silicate or a mixture of silicates. This fused product is then submitted to a cooling and solidifying operation after which it is brought to a proper degree of fineness so that it will dissolve rapidly in water.

If the alkali metal carbonate employed runs as high as the maximum above given, small amounts of alkali metal carbonate may remain undecomposed in the fused product. With the lower ratios as given above I have found that all the carbon dioxide is driven away from the alkali metal carbonate, upon fusion, and the product produced is substantially free from alkali metal carbonate. I have used sodium and potassium metal carbonates in forming said detergent and I find that they may be used as equivalents or even mixtures of them when such mixtures bear a ratio of three quarters to one and one-eighth molecular weight proportions of alkali metal carbonate to one molecular weight proportion of silica. The following are specific illustrations:

To produce this detergent containing sodium metal oxide and silica there should be employed in forming the furnace charge mixture, 60.3 parts by weight of silica and between 79.5 and 119.25 parts of sodium carbonate.

To produce this detergent containing potassium metal oxide and silica there should be employed in forming the furnace charge mixture, 60.3 parts of silica by weight to between 103.65 and 155.5 parts by weight of potassium carbonate.

To produce this detergent from a mixture of sodium carbonate, potassium carbonate and silica the potassium carbonate can be substituted, in part, for the sodium carbonate in the ratio of 138.2 parts of potassium carbonate to 106 parts of sodium carbonate and the mixture will then contain from three quarters to one and one-eighth molecular weight proportions of alkali metal carbonate $(Na_2CO_3+K_2CO_3)$ $3/4$–$1 1/8$ to one molecular weight proportion of silica $(SiO_2)$.

To produce this detergent using an excess of alkali metal carbonate in forming the above furnace charge mixture by the operations of melting, cooling and solidification as described, the said detergent containing from three quarters to one and one-eighth molecular weight proportions of alkali metal oxide to one of silica, will form. Upon solidification such excess of alkali metal carbonate will remain as a congealed solution of the same in my detergent.

I have found that the detergent thus formed when ground to pass through a ten mesh screen or finer, dissolves with sufficient rapidity even in cold water, to be used in washing or cleansing. In virtue of its being formed by fusion it carries no water of hydration. By thus being free from water of hydration a much smaller weight needs to be employed than were it a hydrated substance carrying up to fifty per cent of water. This leads to less weight in handling, smaller containers in shipping and lower cost of freight.

Further, I have found that the detergent acts very much like a normal soap in that, in solution, it liberates alkali metal oxide which combines with fatty or other organic acids and thus removes those which are of a greasy nature from the materials being cleansed, leaving insoluble matter to be easily washed away by the action of water. In fact the detergent described is more efficient than any previously known in that a larger amount of alkali metal oxide is released for use than is the case with an ordinary soap. Therefore, when added to soaps it enriches them instead of merely acting as a diluent.

The alkali metal carbonate can be obtained very pure. If the silica contains lime to any marked extent it can be freed from the same by washing or treatment with acid. The silica should be quite fine and should be thoroughly mixed with the carbonate and then the mixture heated to the melting condition, preferably in a reverberatory furnace. I have found that the detergent can be made in a furnace of a rotary type at a sintering temperature, but in as far as I have gone it adheres too much to the walls of a rotary furnace to make this method of sintering or melting entirely satisfactory. Any furnace may be employed in which the material can be brought to a sintered or fused condition without introducing objectionable impurities.

The ground silica or sand that can be obtained, usually contains some iron oxide and small amounts of alumina, alone or in their combinations, as impurities. I have found that when iron oxide and alumina in small amounts become incorporated in my mixture, that these impurities can be very largely eliminated by mixing with the raw materials substantially a chemically equivalent amount of alkali metal chloride and then heating the mixture to fusion. Iron chloride and aluminum chloride are volatile at the temperature of melting of the product and hence they pass out of the charge to the furnace gases and leave the product substantially free from iron oxide and alumina impurities.

There is commonly left in the product some undecomposed alkali metal carbonate especially when one is producing a detergent containing more than one alkali metal oxide molecule to one silica molecule by weight, but the presence of this alkali metal carbonate for the use to which this product is intended does not interfere with its value. In fact, I may add it in excess as alkali metal carbonate is itself a detergent, but for equal weights it performs several times less detergent work than my detergent. Its presence therefore in my detergent acts as a diluent.

I have found that the detergent I have described after being drawn away from the furnace, cooled and solidified, is hygroscopic, but that it does not absorb water from the air fast enough to interfere with its grinding. Coarsely ground it dissolves slower in water and it is not so suitable for use, but if it is ground so that all of it passes through a ten mesh sieve or finer it dissolves rapidly even in cold water and is then most suited to use as a detergent, washing or cleansing substance. Its hygroscopic nature permits it, upon long enough standing, to absorb water from the air and thereby form with such water a liquid pool but still it is not sufficiently hygroscopic to prevent it being shipped in tight containers to ultimate consumers.

What I claim is:

1. A detergent, comprising alkali metal oxide and silica, consisting of from three quarters to one and one-eighth molecular weight proportions of alkali metal oxide to one molecular weight proportion of silica, together with sodium carbonate and in an anhydrous condition.

2. The step of adding a chemically equivalent quantity of alkali metal chloride to form iron and aluminum chlorides from iron and aluminum compounds as impurities in the raw materials, and volatilizing said chlorides in the process of manufacturing by fusion an anhydrous material containing more than three quarters of one molecular weight proportion of alkali metal oxide to one molecular weight proportion of silica.

3. The process of manufacturing a freely water soluble detergent in an anhydrous condition which consists in forming a mixture of more than three quarters of one molecular weight proportion of alkali metal carbonate to one molecular weight proportion of silica and a chemically equivalent quantity of alkali metal chloride to form iron and aluminum chlorides from iron and aluminum compounds as impurities in the raw materials, heating this mixture to fusion and reaction, running the fused product from the furnace, cooling, solidifying and then comminuting to a degree of fineness so that it will all pass through a ten mesh sieve.

4. The process of making an anhydrous detergent, which consists in mixing alkali metal corbonate, silica containing iron oxide and alumina as impurities and a chemically equivalent quantity of alkali metal chloride to form iron chloride and aluminum chloride with said impurities, and from three quarters to one and one-eighth molecular weight proportions of alkali metal oxide to one molecular weight proportion of silica and heating the mixture to fusion and reaction.

In testimony whereof I hereto affix my signature.

ALFRED H. COWLES.